(12) United States Patent
Tsuchiya et al.

(10) Patent No.: US 12,276,623 B2
(45) Date of Patent: Apr. 15, 2025

(54) FOREIGN MATTER INSPECTION DEVICE

(71) Applicant: HAMAMATSU PHOTONICS K.K., Hamamatsu (JP)

(72) Inventors: Kunihiko Tsuchiya, Hamamatsu (JP); Toshiyasu Suyama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 172 days.

(21) Appl. No.: 18/016,699

(22) PCT Filed: Apr. 30, 2021

(86) PCT No.: PCT/JP2021/017259
§ 371 (c)(1),
(2) Date: Jan. 18, 2023

(87) PCT Pub. No.: WO2022/044430
PCT Pub. Date: Mar. 3, 2022

(65) Prior Publication Data
US 2023/0288349 A1    Sep. 14, 2023

(30) Foreign Application Priority Data
Aug. 26, 2020 (JP) .................................. 2020-142573

(51) Int. Cl.
*G01N 23/18* (2018.01)
*G01N 21/33* (2006.01)
(Continued)

(52) U.S. Cl.
CPC .............. *G01N 23/18* (2013.01); *G01N 21/33* (2013.01); *G01N 21/3563* (2013.01);
(Continued)

(58) Field of Classification Search
CPC .... G01N 23/18; G01N 21/33; G01N 21/3563; G01N 21/90; G01N 23/04; G01N 23/083;
(Continued)

(56) References Cited

U.S. PATENT DOCUMENTS

2017/0089843 A1*  3/2017  Gasperino ............. G06T 7/0004
2019/0049596 A1   2/2019  Behrendt et al.

FOREIGN PATENT DOCUMENTS

JP        S61-249198 A      11/1986
JP        S62-075239 A       4/1987
(Continued)

OTHER PUBLICATIONS

International Preliminary Report on Patentability mailed Mar. 9, 2023 for PCT/JP2021/017259.

*Primary Examiner* — Kiho Kim
(74) *Attorney, Agent, or Firm* — Faegre Drinker Biddle & Reath LLP

(57) ABSTRACT

A foreign matter inspection device includes: an X-ray application unit configured to apply an X-ray to an inspection object carried by a carriage unit; an X-ray detection unit configured to detect an X-ray transmitted by the inspection object and to output X-ray image data based on the detection result; an infrared ray application unit configured to apply an infrared ray to the inspection object carried by the carriage unit; and an infrared ray detection unit configured to detect the infrared ray from the inspection object and to output infrared image data based on the detection result. The infrared ray application unit and the infrared ray detection unit are covered by a protection unit formed of a member blocking the X-ray and transmitting the infrared ray.

12 Claims, 10 Drawing Sheets

(51) Int. Cl.
*G01N 21/3563* (2014.01)
*G01N 21/90* (2006.01)
*G01N 23/04* (2018.01)
*G01N 23/083* (2018.01)

(52) U.S. Cl.
CPC ............. *G01N 21/90* (2013.01); *G01N 23/04* (2013.01); *G01N 23/083* (2013.01); *G01N 2223/643* (2013.01)

(58) Field of Classification Search
CPC ............. G01N 2223/643; G01N 21/94; G01N 2021/1738; G01N 2021/845; G01N 2223/1006; G01N 2223/639; G01N 2223/652; G01N 23/10; G01N 21/8806; G01N 21/8851; G01N 2201/1042; G01N 2223/1016; G01N 2223/401
See application file for complete search history.

(56) References Cited

FOREIGN PATENT DOCUMENTS

| | | | |
|---|---|---|---|
| JP | 2001-013261 A | | 1/2001 |
| JP | 2004279116 A | * | 10/2004 |
| JP | 2006-208098 A | | 8/2006 |
| JP | 2007-309687 A | | 11/2007 |
| JP | 5720028 B1 | | 5/2015 |
| JP | 5720029 B2 | | 5/2015 |
| JP | 6043220 B2 | | 12/2016 |
| JP | 2017-203658 A | | 11/2017 |
| JP | 2018155598 A | * | 10/2018 |
| JP | 2019-020156 A | | 2/2019 |
| JP | 2019-526061 A | | 9/2019 |
| JP | 2019-527369 A | | 9/2019 |
| WO | WO-2007/049305 A1 | | 5/2007 |
| WO | WO-2014/061461 A1 | | 4/2014 |
| WO | WO-2015/049765 A1 | | 4/2015 |
| WO | WO-2018/019817 A1 | | 2/2018 |
| WO | WO-2018/022598 A1 | | 2/2018 |

\* cited by examiner

Fig.7

| | IRON/SUS | STONE | GLASS | RUBBER | PLASTIC | MOISTURE | MOULD | HAIR | DUST | FEATHER | VOID | BUBBLE |
|---|---|---|---|---|---|---|---|---|---|---|---|---|
| METAL DETECTOR | A | C | C | C | C | C | C | C | C | C | C | C |
| X-RAY DETECTION DEVICE | A | A | A | A | C | C | C | C | C | C | A | C |
| INFRARED RAY INSPECTION DEVICE | A | A | B1 | A | A | A | A | A | C | C | C | B2 |
| ULTRAVIOLET RAY (AUTOFLUORESCENCE) DETECTION DEVICE | C | C | C | C | C | C | B3 | C | A | A | C | C |

*Fig.8*
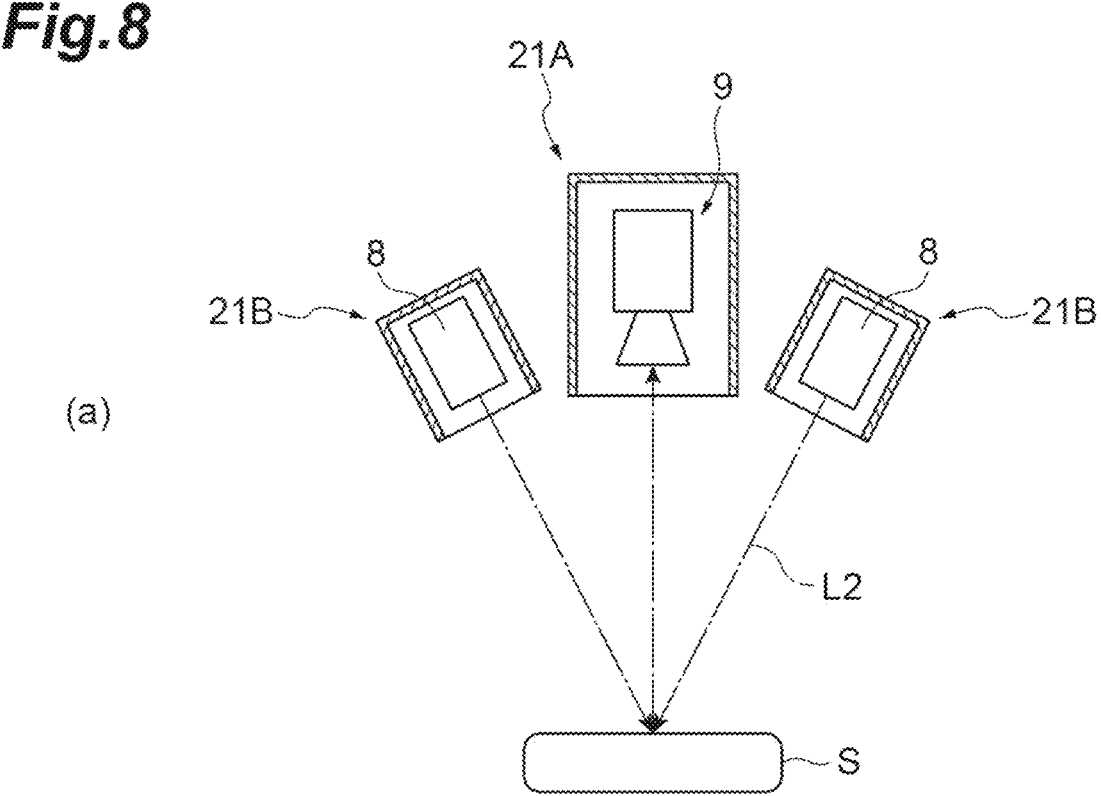
(a)
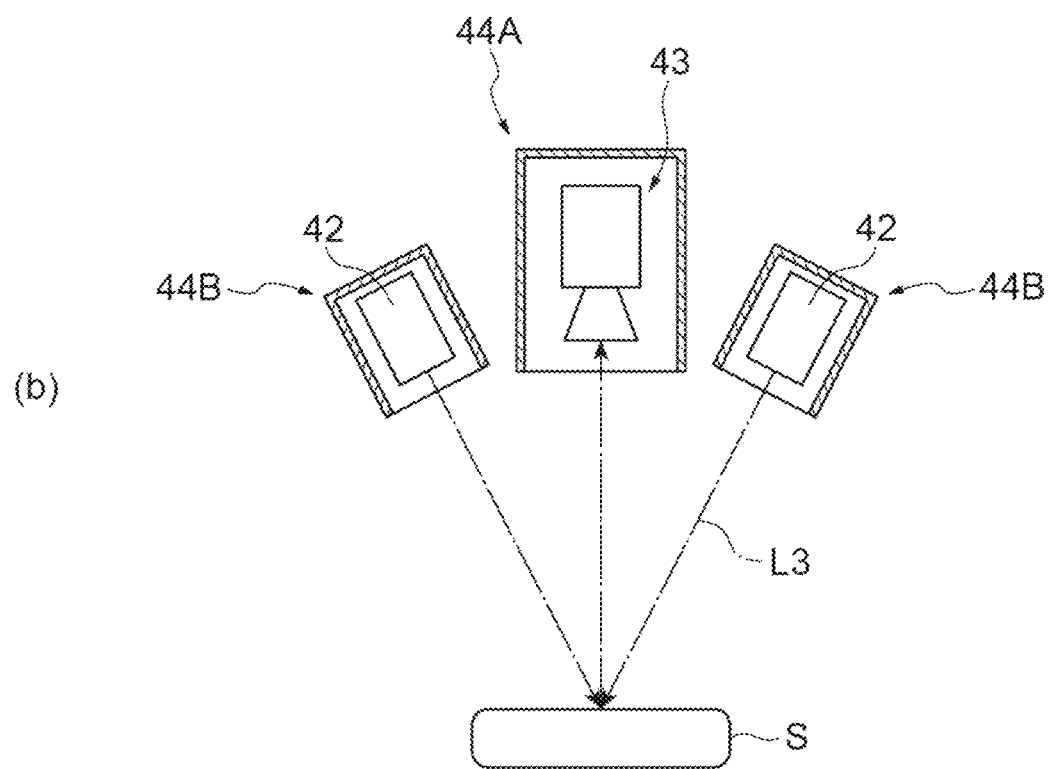
(b)

Fig.9
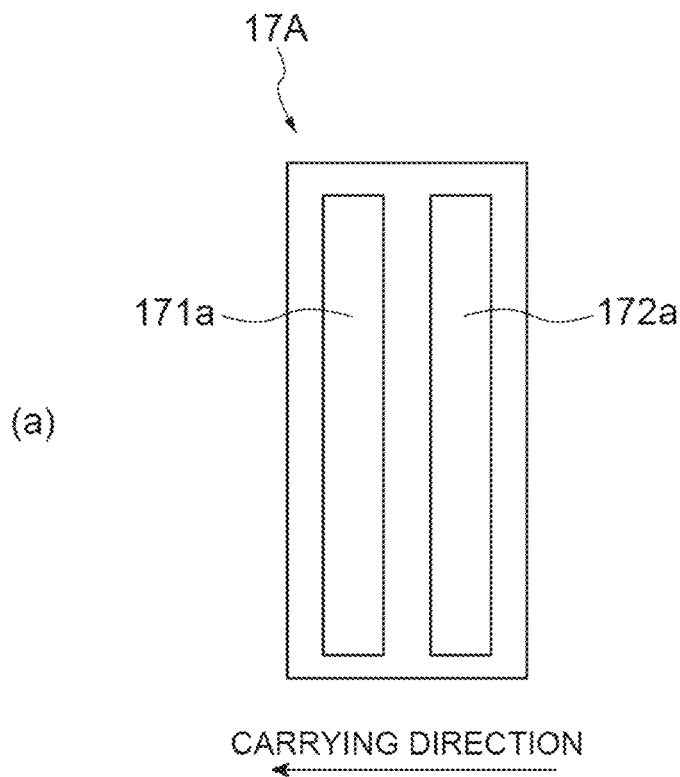
(a)
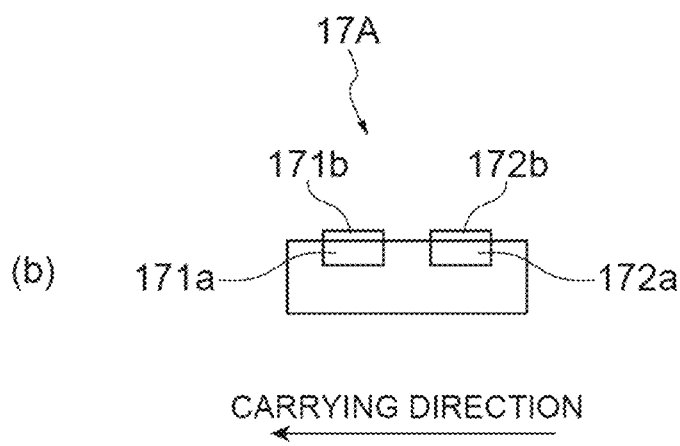
(b)

Fig.10
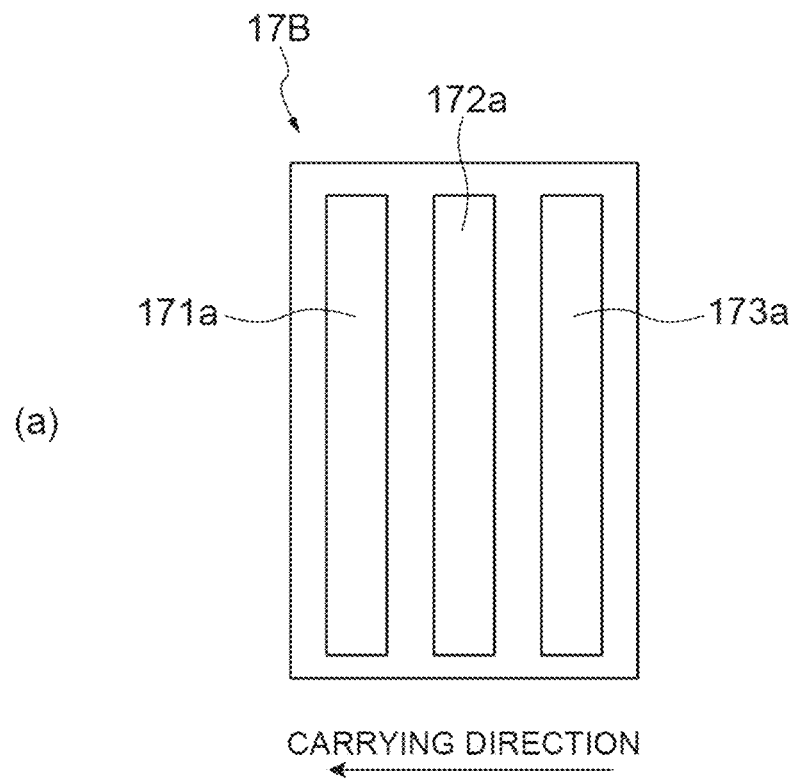
(a)
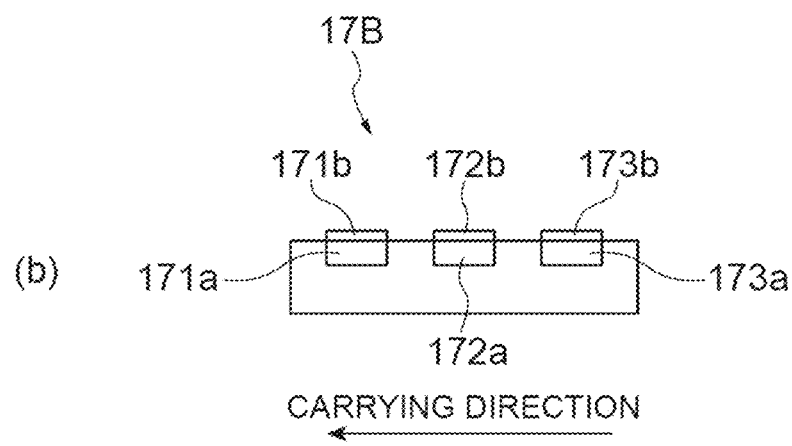
(b)

FOREIGN MATTER INSPECTION DEVICE

TECHNICAL FIELD

The present disclosure relates to a foreign matter inspection device.

BACKGROUND ART

Today, for example, in the field of food production, nondestructive foreign matter inspection using a metal detection device or X-rays inspection device is performed. For example, a package inspection device described in Patent Literature 1 includes a moving mechanism that moves a package in which contents are packed in an outer package, an application unit that applies X-rays to the package, a detection unit that detects X-rays transmitted by the package, an illumination unit that illuminates the package, and an optical detection unit that acquires an optical image of the package.

CITATION LIST

Patent Literature

[Patent Literature 1] WO 2015/049765

SUMMARY OF INVENTION

Technical Problem

The aforementioned X-ray inspection device is characterized by discovering foreign matter which is hard matter such as metal, stones, and glass. On the other hand, the X-ray inspection device is poor at discovering foreign matter which is soft matter such as plastics, insects, hair, and mold. An example of a device contributing to discovering foreign matter which is soft matter is an infrared inspection device using infrared rays. However, against the background in which manufacturers of X-ray inspection devices and infrared inspection devices are separate from each other, the two techniques have developed in different ways. Accordingly, in order to perform inspection of various types of foreign matter including hard matter and soft matter, the X-ray inspection device and the infrared inspection device need to be separately disposed and thus there is necessity for a compact foreign matter inspection device.

The present disclosure was invented to solve the aforementioned problem and an objective thereof is to provide a foreign matter inspection device that can compactly perform inspection of various types of foreign matter including hard matter and soft matter.

Solution to Problem

A foreign matter inspection device according to an aspect of the present disclosure is a foreign matter inspection device that inspects whether foreign matter is included in an inspection object, the foreign matter inspection device including: a carriage unit configured to carry the inspection object in a predetermined carrying direction; an X-ray application unit configured to apply X-rays to the inspection object carried by the carriage unit; an X-ray detection unit configured to detect X-rays transmitted by the inspection object and to output X-ray image data based on the detection result; an infrared ray application unit configured to apply infrared rays to the inspection object carried by the carriage unit; an infrared ray detection unit configured to detect infrared rays from the inspection object and to output infrared image data based on the detection result; a protection unit formed of a member blocking X-ray and transmitting infrared rays and configured to cover the infrared ray application unit and the infrared ray detection unit; and an image generating unit configured to generate an X-ray image of the inspection object based on the X-ray image data and to generate an infrared image of the inspection object based on the infrared image data.

In the foreign matter inspection device, inspection of foreign matter based on application of X-rays and inspection of foreign matter based on application of infrared rays are sequentially performed on an inspection object carried by the carriage unit. Accordingly, in comparison with a case in which an X-ray inspection device and an infrared inspection device are separately provided, it is possible to compactly perform inspection of various types of foreign matter including hard matter and soft matter. Since both X-rays and infrared rays are used, a protection unit formed of a member blocking X-rays and transmitting infrared rays is provided to cover the infrared ray application unit and the infrared ray detection unit. Accordingly, it is possible to prevent a defect from being caused in the infrared ray application unit and the infrared ray detection unit due to X-ray exposure and to accurately inspect foreign matter.

An application position of the X-rays to the inspection object and an application position of the infrared rays thereto may be different in the carrying direction, and a detection timing of X-rays in the X-ray detection unit and a detection timing of infrared rays in the infrared ray detection unit may be synchronized. In this way, by separating the application position of X-rays and the application position of infrared rays and synchronizing the detection timing of-rays and the detection timing of infrared rays, it is possible to align an inspection position based on X-rays and an inspection position based on infrared rays irrespective of a predetermined thickness of the inspection object.

The X-ray detection unit may output a synchronization signal to the infrared ray detection unit according to the detection timing of the X-ray. Accordingly, it is possible to appropriately synchronize the detection timing of X-rays in the X-ray detection unit and the detection timing of infrared rays in the infrared ray detection unit.

The infrared ray detection unit may output a synchronization signal to the X-ray detection unit according to the detection timing of the infrared ray. Accordingly, it is possible to appropriately synchronize the detection timing of X-rays in the X-ray detection unit and the detection timing of infrared rays in the infrared ray detection unit.

The foreign matter inspection device may further include a synchronization unit configured to synchronize a detection timing of X-rays in the X-ray detection unit and a detection timing of infrared rays in the infrared ray detection unit. Accordingly, it is possible to appropriately synchronize the detection timing of X-rays in the X-ray detection unit and the detection timing of infrared rays in the infrared ray detection unit.

The synchronization unit may include a pulse generator. In this case, it is possible to accurately generate a synchronization signal using the pulse generator.

The synchronization unit may include an encoder that detects an amount of movement of the inspection object in the carriage unit. In this case, it is possible to accurately generate a synchronization signal using the encoder.

The infrared ray detection unit may detect at least one of infrared rays reflected by the inspection object and infrared rays transmitted by the inspection object. Accordingly, it is possible to appropriately perform inspection of one surface of the inspection object and inspection of the opposite surface of the inspection object.

The infrared ray detection unit may include a slit that is disposed to correspond to an optical path of infrared rays from the inspection object. Accordingly, it is possible to reduce incidence of X-rays on the infrared ray detection unit from the outside of an optical path of an infrared ray.

The image generating unit may generate an overlap image in which the X-ray image and the infrared image overlap. Accordingly, it is possible to simultaneously ascertain an inspection result based on X-rays and an inspection result based on infrared rays from the overlap image.

The image generating unit may cause the X-ray image and the infrared image to overlap after correcting one of the X-ray image and the infrared image such that the number of pixels of the X-ray image and the number of pixels of the infrared image match. Accordingly, it is possible to improve detection accuracy of foreign matter using the overlap image.

The foreign matter inspection device may further include: an ultraviolet ray application unit configured to apply ultraviolet rays to the inspection object carried by the carriage unit; an ultraviolet ray detection unit configured to detect ultraviolet rays from the inspection object and to output ultraviolet image data based on the detection result; and a protection unit formed of a member blocking X-rays and transmitting ultraviolet rays and configured to cover the ultraviolet ray application unit and the ultraviolet ray detection unit. In this case, it is possible to detect autofluorescence of the inspection object or the like and to inspect more various types of foreign matter.

Advantageous Effects of Invention

According to the present disclosure, it is possible to compactly perform inspection of various types of foreign matter including hard matter and soft matter.

BRIEF DESCRIPTION OF DRAWINGS

FIG. 7 is a diagram illustrating a relationship between an inspection method and inspectable foreign matter.

(a) and (b) of FIG. 8 are diagrams schematically illustrating a modified example of a protection unit.

(a) and (b) of FIG. 9 are diagrams schematically illustrating an example of an infrared line sensor.

(a) and (b) of FIG. 10 are diagrams schematically illustrating an example of an infrared line sensor.

DESCRIPTION OF EMBODIMENTS

Hereinafter, exemplary embodiments of a foreign matter inspection device according to an aspect of the present disclosure will be described in detail with reference to the accompanying drawings.

Figure 1:
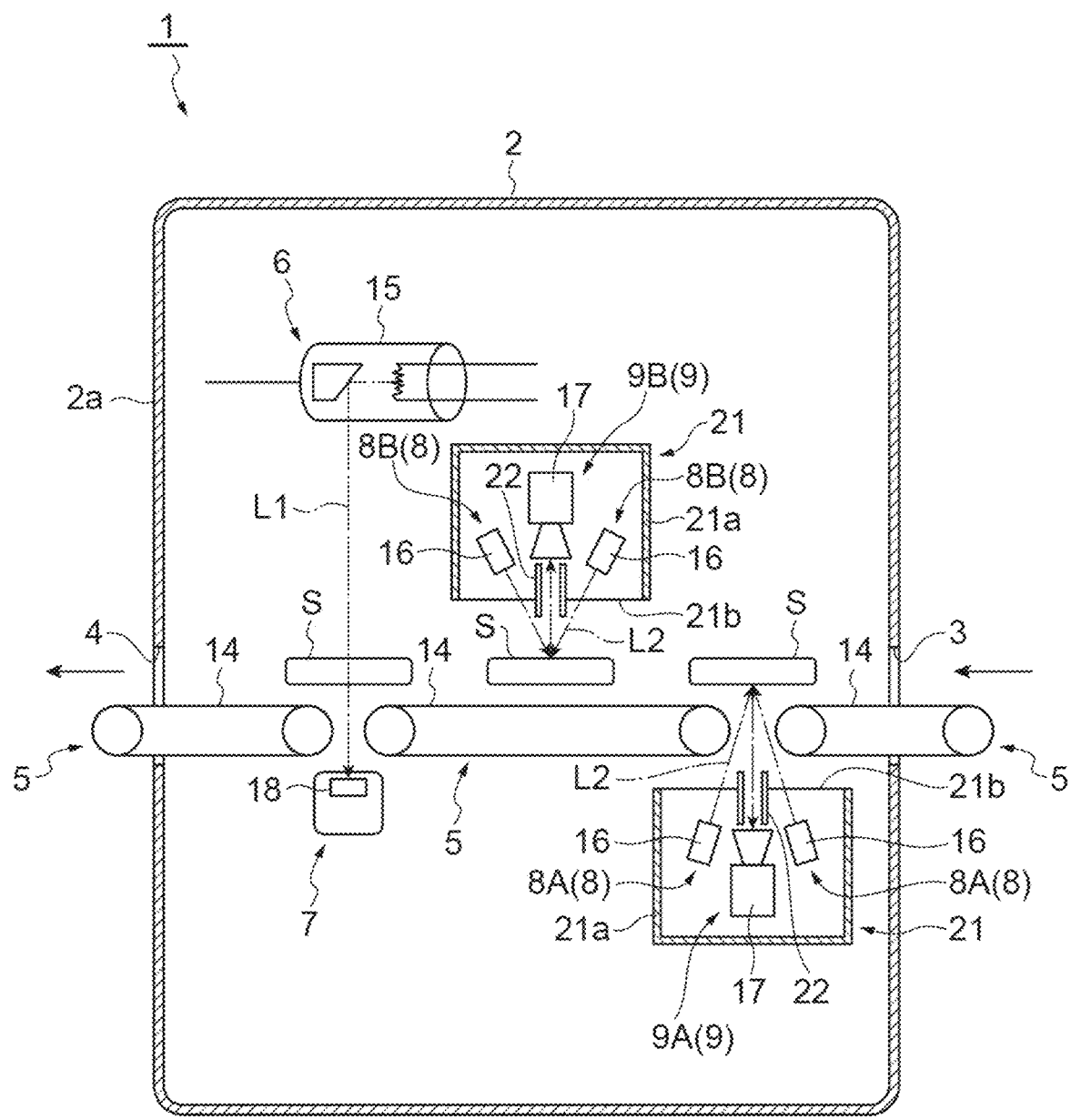
FIG. 1 is a diagram schematically illustrating a configuration of a foreign matter inspection device according to a first embodiment of the present disclosure.
Figure 2:
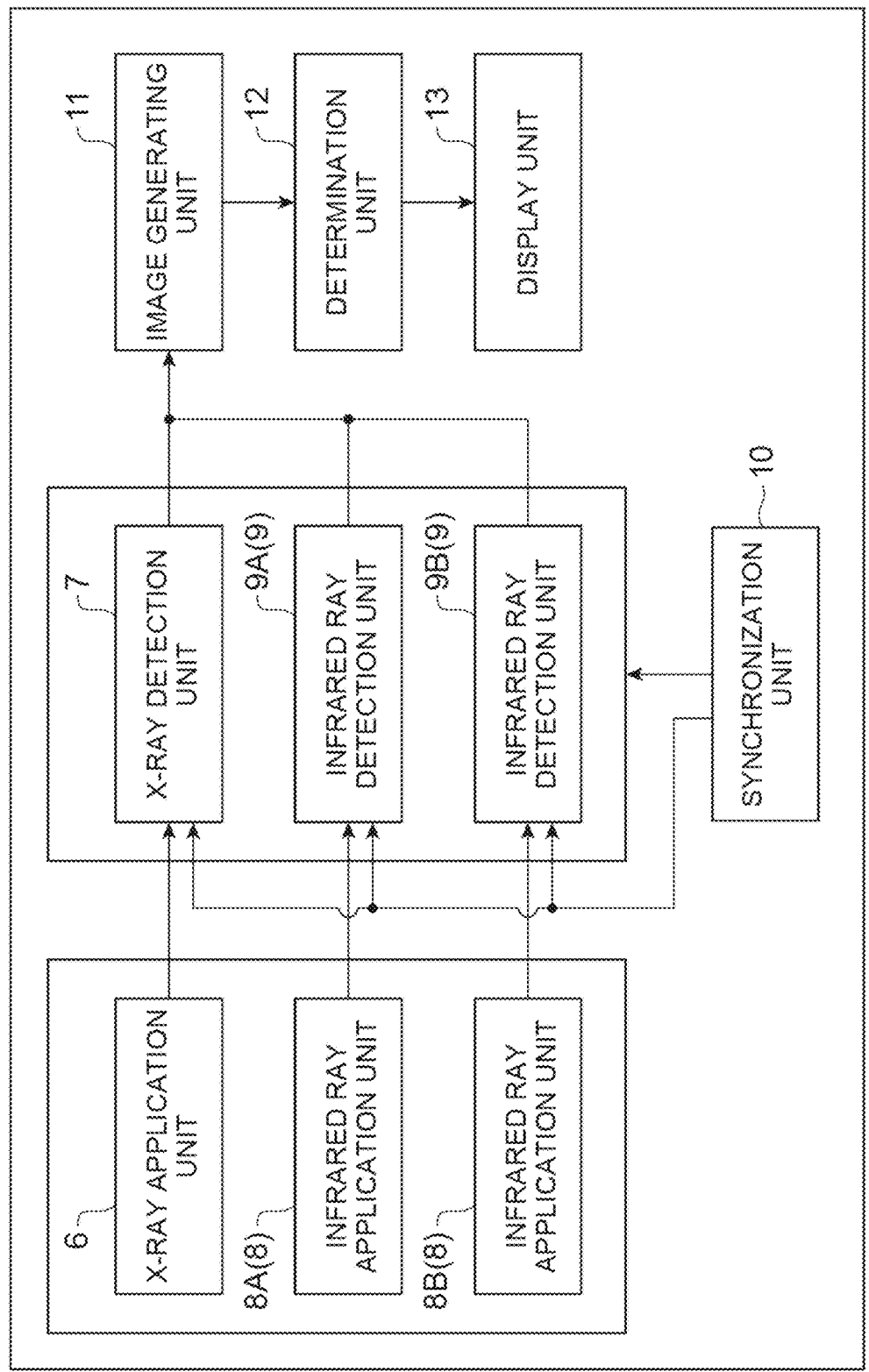
FIG. 2 is a block diagram illustrating functional units of the foreign matter inspection device illustrated in FIG. 1.

FIG. 1 is a diagram schematically illustrating a configuration of a foreign matter inspection device according to a first embodiment of the present disclosure. FIG. 2 is a block diagram illustrating functional units of the foreign matter inspection device illustrated in FIG. 1. The foreign matter inspection device 1 is a device that continuously inspects whether foreign matter is mixed into an inspection object S using both an X-ray L1 and an infrared ray L2. An example of the inspection object S is a package in which food is packed. Foreign matter which is an inspection object in the foreign matter inspection device 1 includes both hard matter and soft matter. The hard matter is matter with a relatively high density such as metal, stones, and glass. The soft matter is matter with a relatively low density such as plastics, bugs, hair, and mold.

As illustrated in FIG. 1, the foreign matter inspection device 1 includes a shielding box 2. The shielding box 2 is formed of a material such as lead capable of blocking an X-ray L1 such that an X-ray L1 used for inspection does not leak from the shielding box 2. An inlet 3 through which an inspection object S is introduced into the shielding box 2 and an outlet 4 through which an inspection object S is discharged from the shielding box 2 are provided in opposite side surfaces 2a and 2a of the shielding box 2.

As illustrated in FIGS. 1 and 2, the foreign matter inspection device 1 includes a carriage unit 5, an X-ray application unit 6, an X-ray detection unit 7, an infrared ray application unit 8, an infrared ray detection unit 9, a synchronization unit 10, an image generating unit 11, a determination unit 12, and a display unit 13. The carriage unit 5 is a unit that carries an inspection object S in a predetermined carrying direction. In the example illustrated in FIG. 1, the carriage unit 5 includes a plurality of belt conveyors 14 that are horizontally arranged to correspond to positions of the inlet 3 and the outlet 4 of the shielding box 2. A plurality of inspection objects S are carried at a constant speed and at a constant interval from right to left in the drawing of FIG. 1 by the plurality of belt conveyors 14. An inspection object S introduced into the shielding box 2 from the inlet 3 is subjected to inspection using an X-ray L1 and an infrared ray L2 in the shielding box 2 and then is discharged from the outlet 4 to the outside of the shielding box 2.

The X-ray application unit 6 is a unit that applies an X-ray L1 to an inspection object S carried by the carriage unit 5. In this embodiment, the X-ray application unit 6 includes, for example, an X-ray tube 15 and is disposed above the carriage unit 5 on the outlet 4 side in the shielding box 2. An X-ray L1 generated from an X-ray focus (a point light source) of the X-ray tube 15 exits downwardly from the X-ray tube 15. The X-ray L1 is transmitted by the inspection object S on the carriage unit 5 and is then incident on the X-ray detection unit 7. In this embodiment, a gap between the belt conveyors 14 and 14 is located at an application position of the X-ray L1 to the inspection object S. Accordingly, the X-ray L1 transmitted by the inspection object S does not come into contact with the belt conveyors 14 and goes to the X-ray detection unit 7.

The X-ray detection unit 7 is a unit that detects an X-ray L1 transmitted by an inspection object S and outputs X-ray image data based on the detection result. The X-ray detection unit 7 includes, for example, an X-ray line sensor 18 and is disposed below the carriage unit 5 at a position just below the X-ray application unit 6. The X-ray detection unit 7 detects an X-ray L1 transmitted by the inspection object S and generates X-ray image data based on the detection result. The X-ray detection unit 7 outputs the generated X-ray image data to the image generating unit 11 (see FIG. 2). The X-ray line sensor of the X-ray detection unit 7 may be a single line sensor or a multi-line sensor. The X-ray detection unit 7 may include a time delay integration (TDI) sensor. The X-ray detection unit 7 may be a detector corresponding to multiple energies such as a dual-energy X-ray line sensor. A detection method thereof may be an indirect conversion method using a scintillator or may be a direct conversion method not using a scintillator.

In the example illustrated in FIG. 1, the X-ray L1 passes through the gap between the belt conveyors 14 and 14, but no gap is formed between the belt conveyors 14 by forming the belt conveyors 14 out of a material having an X-ray transmitting property. A slit formed of a member blocking an X-ray may be provided between the X-ray tube 15 and the inspection object S and application of an X-ray L1 to sides other than the inspection object S may be curbed. In this case, the slit can be formed of tungsten, iron, stainless steel, or copper capable of blocking an X-ray L1.

The infrared ray application unit 8 is a unit that applies an infrared ray L2 to an inspection object S carried by the carriage unit 5. The infrared ray application unit 8 includes, for example, a pair of infrared light sources 16 and 16. For example, a light emitting diode, a halogen lamp, or a laser light source is used as the infrared light sources 16. The infrared ray detection unit 9 is a unit that detects an infrared ray L2 from an inspection object S and outputs infrared image data based on the detection result. The infrared ray detection unit 9 includes, for example, an infrared line sensor 17 such as an InGaAs line sensor. The infrared ray detection unit 9 detects some components of the infrared ray L2 reflected by the inspection object S and generates infrared image data based on the detection result. The infrared ray detection unit 9 outputs the generated infrared image data to the image generating unit 11 (see FIG. 2). Similarly to the X-ray detection unit 7, the infrared line sensor 17 of the infrared ray detection unit 9 may be a single line sensor or a multi-line sensor includes a plurality of line sensors. The multi-line sensor may have sensitivity wavelengths different by the line sensors. The infrared line sensor 17 may include a TDI sensor. In addition to the infrared line sensor 17, for example, an imaging spectroscopic camera in which an imaging spectroscopic optical system capable of spectroscopically dividing light to visible wavelengths to infrared wavelengths and a two-dimensional detection element are combined may be used as the infrared ray detection unit 9.

In this embodiment, an application position of an X-ray L1 and an application position of an infrared ray L2 with respect to an inspection object S are different in the carrying direction. In the example illustrated in FIG. 1, the application position of an infrared ray L2 to the inspection object S is on a head side of the carrying direction, and the application position of an X-ray L1 to the inspection object S is on a tail side of the carrying direction. The front-rear relationship between the application position of an X-ray L1 and the application position of an infrared ray L2 with respect to an inspection object S in the carrying direction of the inspection object S may be opposite to that in the example illustrated in FIG. 1. That is, the application position of an infrared ray L2 to the inspection object S may be on the tail side of the carrying direction, and the application position of an X-ray L1 to the inspection object S may be on the head side of the carrying direction.

In this embodiment, as illustrated in FIGS. 1 and 2, the infrared ray application unit 8 and the infrared ray detection unit 9 include an infrared ray application unit 8A and an infrared ray detection unit 9A that inspect one surface of an inspection object S and an infrared ray application unit 8B and an infrared ray detection unit 9B that inspect the other surface of the inspection object S. The infrared ray application unit 8A and the infrared ray detection unit 9A are disposed below the carriage unit 5 in the vicinity of the inlet 3 in the shielding box 2. Some components of an infrared ray L2 applied upward from the infrared ray application unit 8A are reflected by one surface of the inspection object S on the carriage unit 5 and then are incident on the infrared ray detection unit 9A.

In this embodiment, a gap between the belt conveyors 14 and 14 is located at the application position of an infrared ray L2 to one surface of the inspection object S, and an infrared ray L2 going to the inspection object S and an infrared ray L2 reflected by the one surface of the inspection object S go to the infrared ray detection unit 9A without coming into contact with the belt conveyors 14. The infrared ray application unit 8B and the infrared ray detection unit 9B are disposed above the carriage unit 5 on the rear side of the infrared ray application unit 8A and the infrared ray detection unit 9A. Some components of an infrared ray L2 applied downward from the infrared ray application unit 8B are reflected by the other surface of the inspection object S on the carriage unit 5 and then are incident on the infrared ray detection unit 9B. In the example illustrated in FIG. 1, an infrared ray L2 passes through the gap between the belt conveyors 14 and 14, but no gap is formed between the belt conveyors 14 by forming the belt conveyors 14 out of a material having an infrared ray transmitting property.

The infrared ray application unit 8 and the infrared ray detection unit 9 are disposed in a protection unit 21 as illustrated in FIG. 1. The protection unit 21 is provided to cover the infrared ray application unit 8 and the infrared ray detection unit 9. Similarly to the shielding box 2, a body portion 21a of the protection unit 21 is formed of a material such as lead, tungsten, iron, stainless steel, or copper capable of blocking X-rays L1. A window portion 21b formed of a member blocking X-rays L1 and transmitting infrared rays L2 is provided on a front part (a part located on an optical path of an infrared ray L2 from the infrared ray application unit 8 and an infrared ray L2 from the inspection object S) of the protection unit 21. An example of the material of the window portion 21b is lead glass. Lead-free radiation blocking glass may be used as the material of the window portion 21b. The lead-free radiation blocking glass may include, for example, a heavy element such as Sr, Ba, Ti, B, W, Si, Gd, or Zr. The material of the window portion 21b is not limited to glass, but may be a resin such as acryl.

As illustrated in FIG. 1, the infrared ray detection unit 9 includes a slit 22 which is disposed to correspond to an optical path of an infrared ray L2 from an inspection object S. For example, similarly to the shielding box 2, the slit 22 is formed of a material such as lead, tungsten, iron, stainless steel, or copper capable of blocking X-rays L1. The slit 22 may have a constant thickness or have a tubular shape. By increasing the thickness of the slit 22, it is possible to prevent incidence of scattered X-rays or stray infrared rays and to reduce noise due to the scattered X-rays or stray infrared rays. Accordingly, an SN ratio can be improved and improvement in inspection accuracy can be achieved. The material of the slit 22 may be lead glass or lead-free radiation blocking glass similarly to the window portion 21b. In this embodiment, the slit 22 is disposed in the vicinity of a detection surface of the infrared ray detection unit 9 in the protection unit 21. A front end of the slit 22 may be located outside of the protection unit 21 (the window portion 21b). A rear end of the slit 22 may be located outside of the protection unit 21 (the window portion 21b). That is, the whole slit 22 may be located outside of the protection unit 21 (the window portion 21b).

The synchronization unit 10, the image generating unit 11, and the determination unit 12 are physically constituted, for example, by a computer system including a processor and a memory. Examples of the computer system include a personal computer, a microcomputer, a cloud server, and a smart device (such as a smartphone or a tablet terminal). The image generating unit 11 may be constituted by a programmable logic device (PLD) or may be constituted by an integrated circuit such as a field-programmable gate array (FPGA).

The synchronization unit 10 is a unit that synchronizes a detection timing of an X-ray L1 in the X-ray detection unit 7 and a detection timing of an infrared ray L2 in the infrared ray detection unit 9. In this embodiment, the synchronization unit 10 is constituted by a pulse generator and is communicatively connected to the X-ray detection unit 7 and the infrared ray detection unit 9 (9A and 9B). In this case, the synchronization unit 10 sets a time required for an inspection object S to be carried from the application position of an infrared ray L2 to the application position of an X-ray L1 as a delay time. The synchronization unit 10 outputs a synchronization signal to the infrared ray detection unit 9 and then outputs a synchronization signal to the X-ray detection unit 7 when the delay time has elapsed after a time at which an infrared ray L2 has been detected by the infrared ray detection unit 9.

The image generating unit 11 is a unit that generates an inspection image of an inspection object S. The image generating unit 11 receives X-ray image data from the X-ray detection unit 7 and receives infrared image data from the infrared ray detection unit 9 (9A and 9B). The image generating unit 11 generates an X-ray image of the inspection object S based on the X-ray image data and generates an infrared image of the inspection object S based on the infrared image data. The image generating unit 11 generates an overlap image in which the X-ray image and the infrared image overlap and outputs the overlap image as an inspection image to the determination unit 12. At the time of generating the overlap image, the image generating unit 11 corrects at least one of the X-ray image and the infrared image such that the number of pixels in the X-ray image and the number of pixels in the infrared image match, and then causes the X-ray image and the infrared image to overlap.

Figure 3:
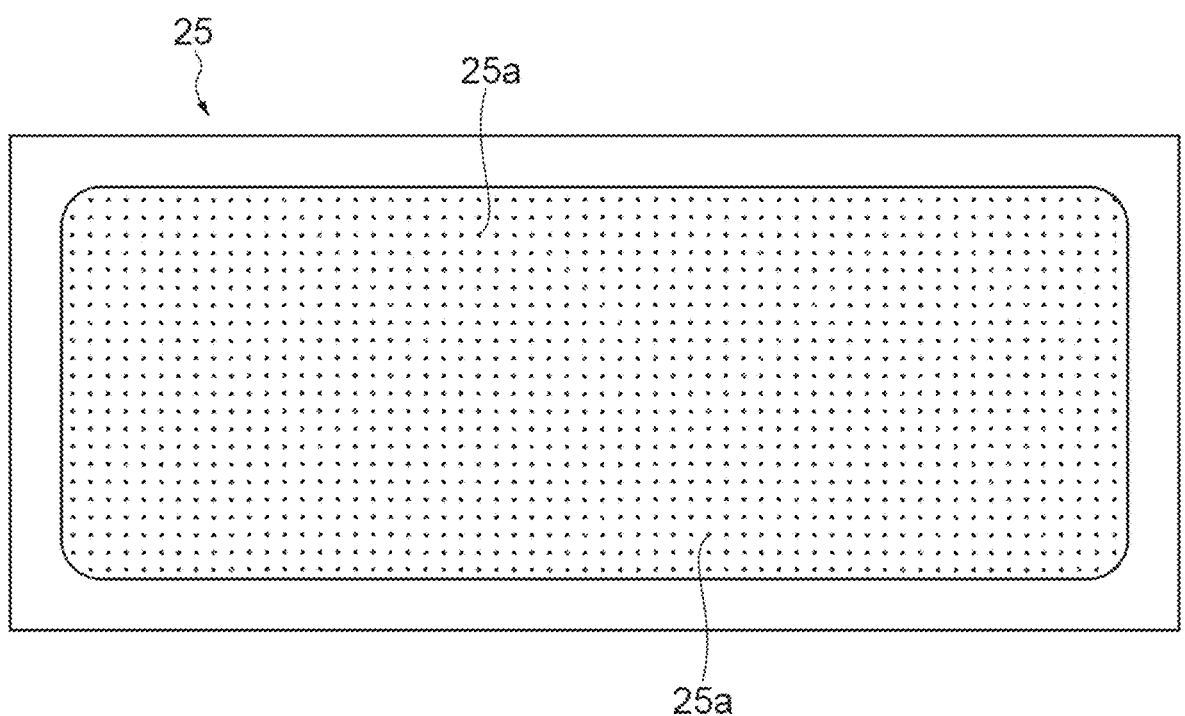
FIG. 3 is a plan view illustrating an example of a correction chart.

In overlapping of the X-ray image and the infrared image, pixel positions of the X-ray image and pixel positions of the infrared image need to be matched. In this regard, for example, a correction chart 25 illustrated in FIG. 3 is used in this embodiment. The correction chart 25 is obtained, for example, by providing pores 25a in a matrix shape in a rectangular stainless steel plate. In preparation for inspecting an inspection object S, the correction chart 25 is carried by the carriage unit 5, and an X-ray image and an infrared image of the correction chart 25 are acquired. By transforming the acquired X-ray image and infrared image of the correction chart 25, it is possible to match the pixel positions of the X-ray image and the pixel positions of the infrared image. For example, affine transformation or projective transformation can be used as the image transforming method.

The determination unit 12 is a unit that determines whether foreign matter is included in an inspection object S based on the inspection images. When inspection images of the inspection object S are received from the image generating unit 11, the determination unit 12 performs a predetermined image processing on the inspection images and determines whether foreign matter is included therein. The determination unit 12 outputs information indicating the determination result along with the inspection images to the display unit 13. The display unit 13 is, for example, a display and displays the information indicating the determination result along with the inspection images. The foreign matter inspection device 1 may further include an alarm unit that gives an alarm using warning sound or the like when it is determined that foreign matter is included in the inspection object S in addition to the display unit 13.

In the foreign matter inspection device 1 having the aforementioned configuration, inspection of foreign matter based on application of an X-ray L1 and inspection of foreign matter based on application of an infrared ray L2 are sequentially performed on an inspection object S carried by the carriage unit 5. Accordingly, in comparison with a case in which an X-ray inspection device and an infrared inspection device are separately provided, it is possible to compactly perform inspection of various types of foreign matter including hard matter and soft matter. In comparison with the case in which an X-ray inspection device and an infrared inspection device are separately provided, misalignment of an object due to reception and transmission of the inspection object S between the devices or the like decreases and thus it is possible to enhance inspection accuracy. Since both an X-ray L1 and an infrared ray L2 are used in the foreign matter inspection device 1, the protection unit 21 including a member blocking the X-ray L1 and transmitting the infrared ray L2 is provided to cover the infrared ray application unit 8 and the infrared ray detection unit 9. Accordingly, it is possible to prevent a defect from being caused in the infrared ray application unit 8 and the infrared ray detection unit 9 due to exposure to the X-ray L1 and to accurately inspect foreign matter.

In the foreign matter inspection device 1, an application position of an X-ray L1 to the inspection object S and an application position of an infrared ray L2 are different in the carrying direction, and a detection timing of the X-ray L1 in the X-ray detection unit 7 and a detection timing of the infrared ray L2 in the infrared ray detection unit 9 are synchronized by the synchronization unit 10. When an X-ray L1 and an infrared ray L2 are applied to an inspection object S at the same position in the carrying direction, for example, the infrared ray L2 needs to be applied from just above the inspection object S and the X-ray needs to be applied from obliquely above the inspection object S. In this case, when the inspection object S has a constant thickness, it is conceivable that an inspection position using the X-ray and an inspection position using the infrared ray be misaligned. On the other hand, in the foreign matter inspection device 1, by causing the application position of an X-ray L1 and the application position of an infrared ray L2 to be different and synchronizing the detection timing of an X-ray L1 and the detection timing of an infrared ray L2, it is possible to cause an inspection position based on an X-ray L1 and an inspection position based an infrared ray L2 irrespective of a predetermined thickness of the inspection object S.

In the foreign matter inspection device 1, the synchronization unit 10 includes a pulse generator. Accordingly, it is possible to accurately generate a synchronization signal using the pulse generator.

In the foreign matter inspection device 1, the infrared ray detection unit 9 (9A and 9B) detects infrared rays L2 reflected by one surface and the other surface of the inspection object S. Accordingly, it is possible to appropriately perform inspection of one surface of the inspection object S and inspection of the opposite surface of the inspection object S.

In the foreign matter inspection device 1, the infrared ray detection unit 9 includes a slit 22 which is disposed to correspond to an optical path of an infrared ray L2 from an inspection object S. By providing the slit 22, it is possible to reduce incidence of an X-ray L1 on the infrared ray detection unit 9 from the outside of the optical path of the infrared ray L2. The slit 22 may have a constant thickness or have a tubular shape. By increasing the thickness of the slit 22, it is possible to prevent incidence of scattered X-rays or stray infrared rays and to reduce noise due to the scattered X-rays or stray infrared rays. Accordingly, an SN ratio can be improved and improvement in inspection accuracy can be achieved.

In the foreign matter inspection device 1, the image generating unit 11 generates an overlap image in which an X-ray image and an infrared image overlap. Accordingly, by using the overlap image as an inspection image of the inspection object S, it is possible to simultaneously ascertain an inspection result based on an X-ray L1 and an inspection result based on an infrared ray L2 from the overlap image.

Figure 4:
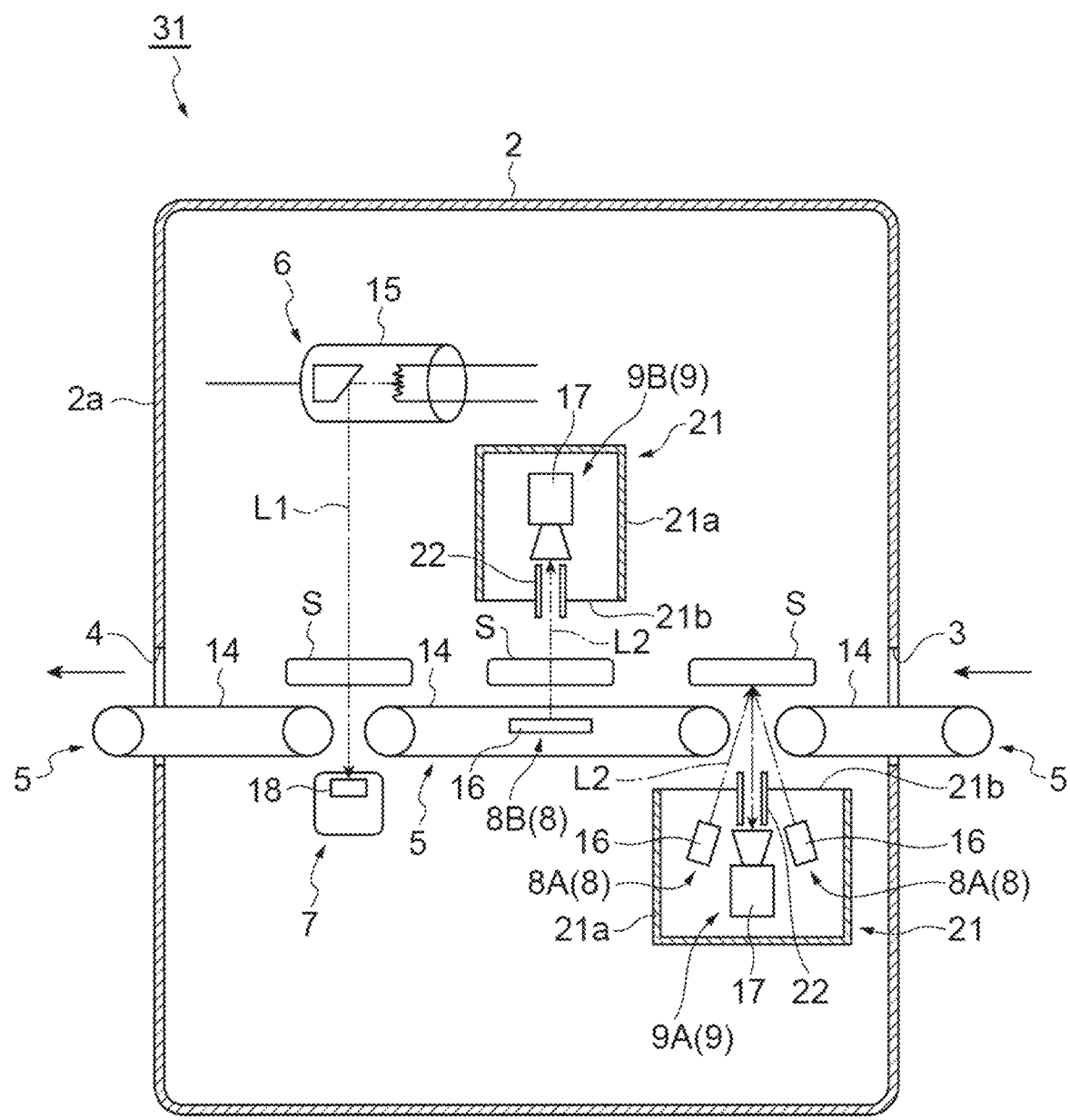
FIG. 4 is a diagram schematically illustrating a configuration of a foreign matter inspection device according to a second embodiment of the present disclosure.

FIG. 4 is a diagram schematically illustrating a configuration of a foreign matter inspection device according to a second embodiment of the present disclosure. As illustrated in the drawing, a foreign matter inspection device 31 according to the second embodiment is different from that of the first embodiment in that an infrared ray detection unit 9B is configured to detect an infrared ray L2 transmitted by an inspection object S. More specifically, in the foreign matter inspection device 31, a belt conveyor 14 of the carriage unit 5 is formed of a material having a property of transmitting an infrared ray L2. The infrared ray application unit 8B is disposed inside of the belt conveyor 14 (below a carrying surface). The infrared ray application unit 8B may be protected by a material blocking an X-ray L1. An infrared ray L2 emitted from the infrared ray application unit 8B is transmitted by the belt conveyor 14, passes through the inspection object S on the carriage unit 5 from one surface to the other surface, and is incident on the infrared ray detection unit 9B.

With the foreign matter inspection device 31, similarly to the first embodiment, it is possible to compactly perform inspection of various types of foreign matter including hard matter and soft matter. It is possible to prevent a defect from being caused in the infrared ray application unit 8 and the infrared ray detection unit 9 due to exposure to the X-ray L1 and to accurately inspect foreign matter. In the foreign matter inspection device 31, since whether foreign matter is included is inspected in combination of the infrared ray L2 transmitted by the inspection object S and the infrared ray L2 reflected by one surface of the inspection object S, it is possible to achieve improvement in inspection accuracy of foreign matter.

In the embodiment illustrated in FIG. 4, the belt conveyor 14 is formed of a material having a property of transmitting an infrared ray L2 and the infrared ray application unit 8B is disposed inside of the belt conveyor 14, but a configuration in which a gap between the belt conveyors 14 and 14 is located at the application position of the infrared ray L2 from the infrared ray application unit 8B such that the infrared ray L2 from the infrared ray application unit 8B goes to the inspection object S without coining into contact with the belt conveyors 14 may be employed. In the embodiment illustrated in FIG. 4, the infrared ray application unit 8B applies an infrared ray L2 from below the inspection object S, but a configuration in which the infrared ray application unit 8B applies an infrared ray L2 from above the inspection object S may be employed.

Figure 5:
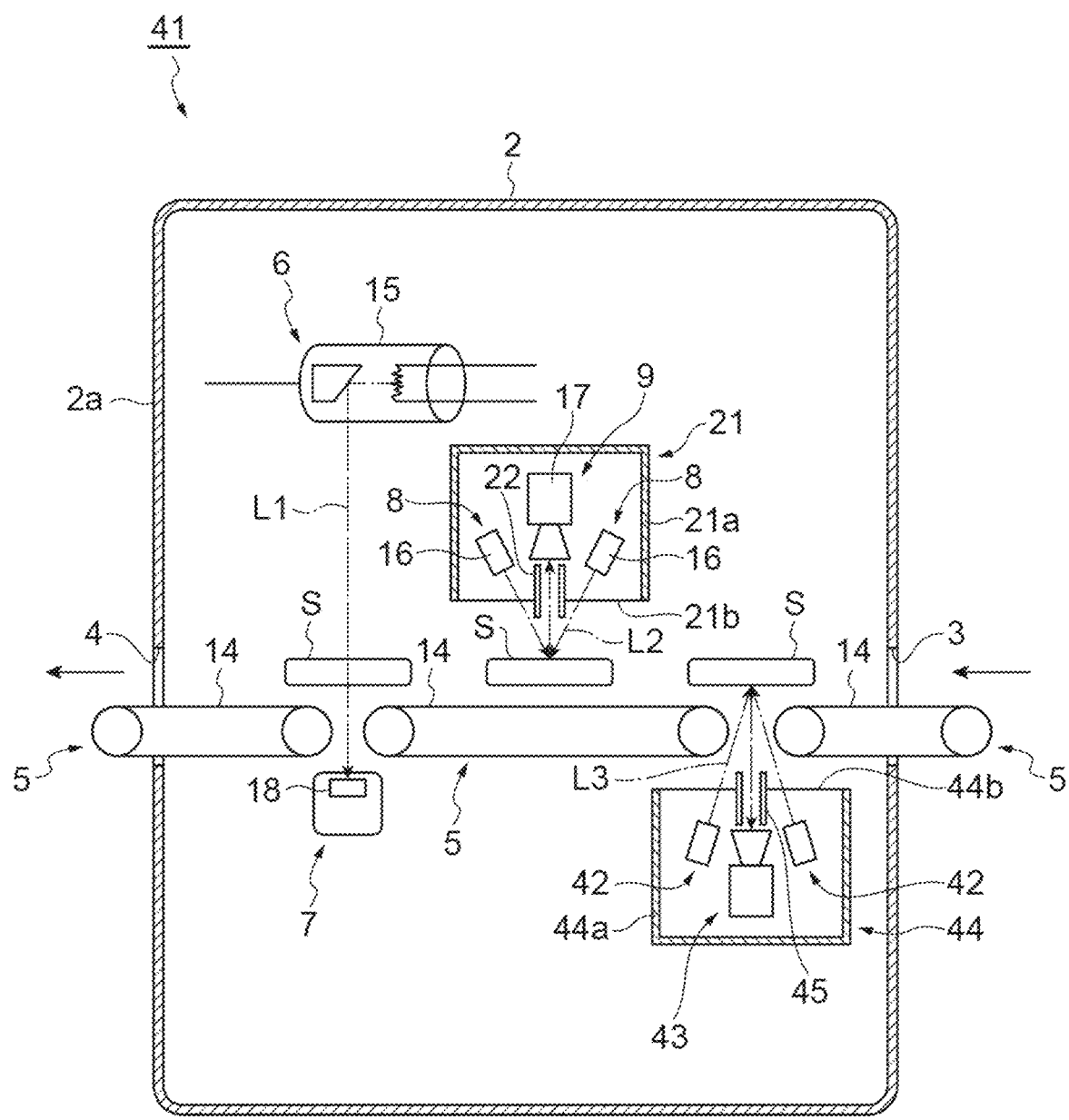
FIG. 5 is a diagram schematically illustrating a configuration of a foreign matter inspection device according to a third embodiment of the present disclosure.
Figure 6:
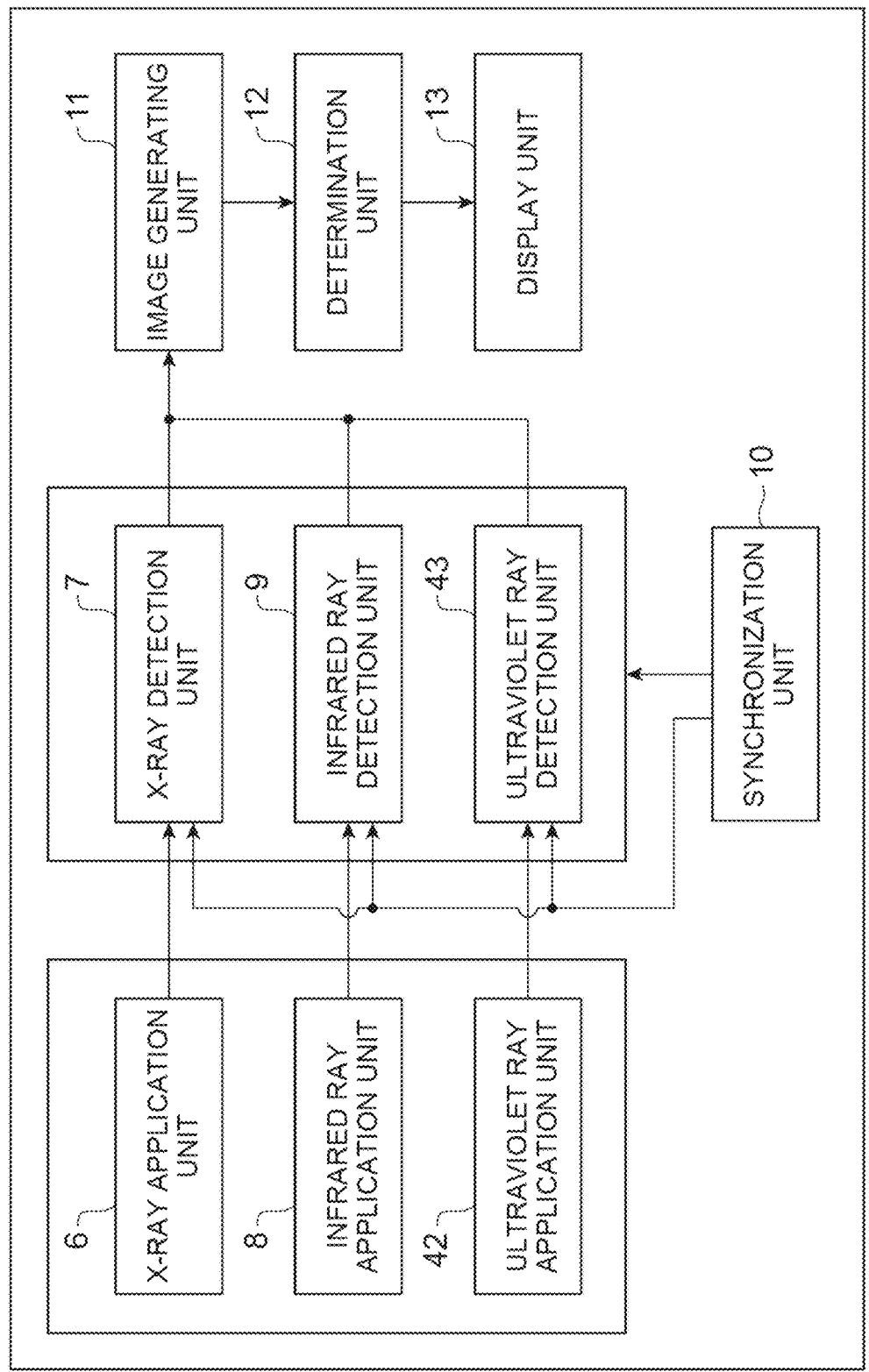
FIG. 6 is a block diagram illustrating functional units of the foreign matter inspection device illustrated in FIG. 5.

FIG. 5 is a diagram schematically illustrating a configuration of a foreign matter inspection device according to a third embodiment of the present disclosure. FIG. 6 is a block diagram illustrating functional units of the foreign matter inspection device illustrated in FIG. 5. As illustrated in the drawing, a foreign matter inspection device 41 according to the third embodiment is different from that of the first embodiment in that inspection based on an ultraviolet ray L3 is additionally combined. More specifically, in the foreign matter inspection device 41, an ultraviolet ray application unit 42 and an ultraviolet ray detection unit 43 are provided instead of the infrared ray application unit 8A and the infrared ray detection unit 9A. When autofluorescence of an inspection object S based on an ultraviolet ray L3 is detected, the ultraviolet ray detection unit 43 may be constituted by a single line sensor, a multi-line sensor, a TDI sensor, or the like capable of detecting the fluorescence (for example, visible light).

The ultraviolet ray application unit 42 and the ultraviolet ray detection unit 43 are disposed in a protection unit 44. Here, a body portion 44a of the protection unit 44 is formed of a material such as lead capable of blocking an X-ray L1, and a window portion 44b of the protection unit 44 is formed of a member blocking an X-ray L1 and transmitting an ultraviolet ray L3. In the protection unit 44, a slit 45 is disposed in the vicinity of a detection surface of the ultraviolet ray detection unit 43. Similarly to the slit 22, the slit 45 may have a constant thickness or have a tubular shape. A front end of the slit 45 may be located outside of the protection unit 44 (the window portion 44b). A rear end of the slit 45 may be located outside of the protection unit 44 (the window portion 44b). That is, the whole slit 45 may be located outside of the protection unit 44 (the window portion 44b).

Some components of an ultraviolet ray L3 applied upward from the ultraviolet ray application unit 42 are reflected by one surface of the inspection object S on the carriage unit 5 and then are incident on the ultraviolet ray detection unit 43. The ultraviolet ray detection unit 43 outputs ultraviolet image data based on the detection result. The image generating unit 11 generates an overlap image in which an X-ray image based on the X-ray image data, an infrared image based on the infrared image data, and an ultraviolet image based on the ultraviolet image data overlap and outputs the overlap image as an inspection image of the inspection object S to the determination unit 12.

With the foreign matter inspection device 41, similarly to the first embodiment, it is possible to compactly perform inspection of various types of foreign matter including hard matter and soft matter. It is possible to prevent a defect from being caused in the infrared ray application unit 8, the infrared ray detection unit 9, the ultraviolet ray application unit 42, and the ultraviolet ray detection unit 43 due to exposure to the X-ray L1 and to accurately inspect foreign matter. By using the ultraviolet ray L3, it is possible to detect autofluorescence of the inspection object S or the like and to inspect more various types of foreign matter.

FIG. 7 is a diagram illustrating a relationship between an inspection method and inspectable foreign matter. In the drawing, foreign matter which can be inspected using four detection system including a metal detector, an X-ray detection device, an infrared ray detection device, an ultraviolet ray (autofluorescence) detection device are summarized. The metal detector is a reference example. In the drawing, "A" means inspectable, "B (B1 to B3)" means inspectable under predetermined conditions, and "C" means non-inspectable. In the metal detector, iron/SUS is detectable. In the X-ray detection device, iron/SUS, stones, glass, rubber, and voids are detectable.

In the infrared ray detection device, iron/SUS, stones, rubber, plastics, moisture, mold, and hair are detectable. Transparent glass is not detectable, and semi-transparent is detectable (B1 in FIG. 7). Bubbles are detectable when a package of an inspection object is transparent (B2 in FIG. 7). In the ultraviolet ray (autofluorescence) detection device, dust and feather are detectable, and application to detection of cartilage of a chicken or the like is conceivable. Mold may be detectable depending on types thereof (B3 in FIG. 7). Accordingly, as in the first to third embodiments, it can be seen that it is possible to inspect various types of foreign matter including hard matter and soft matter by performing inspection based on combination of an X-ray L1 and an infrared ray L2 or inspection based on additional combination of an ultraviolet ray L3.

The present disclosure is not limited to the aforementioned embodiments. For example, in the aforementioned embodiments, the synchronization unit 10 is constituted by a pulse generator, but the synchronization unit 10 may be constituted by an encoder. In this case, the encoder detects an amount of movement of an inspection object S on the carriage unit 5 and outputs a synchronization signal to the X-ray detection unit 7 when the inspection object S is carried from the application position of an infrared ray L2 to the application position of an X-ray L1. Without using the pulse generator or the encoder, the synchronization signal may be output from the X-ray detection unit 7 to the infrared ray detection unit 9 or the synchronization signal may be output from the infrared ray detection unit 9 to the X-ray detection unit 7. The same is true of the case in which the ultraviolet ray detection unit 43 is provided.

In the aforementioned embodiments, from what surfaces of an inspection object S on the carriage unit 5 an X-ray L1, an infrared ray L2, and an ultraviolet ray L3 are to be applied can be appropriately changed depending on type, shape, and the like of the inspection object S. For example, in the aforementioned embodiments, an X-ray L1 transmitted by one surface of an inspection object S is detected on the other surface side of the inspection object S, but the X-ray L1 transmitted by the other surface of the inspection object S may be detected on the one surface side of the inspection object S.

The number of provided infrared ray detection units 9 is not limited to two, but may be one or three or more. When a plurality of infrared ray detection units 9 are provided, synchronization may be taken by causing one infrared ray detection unit 9 to output a synchronization signal to other infrared ray detection units 9. The image generating unit 11 may perform a process of making the inspection images of the inspection object S dimensionless and matching proportions therebetween in addition to a process of matching the number of pixels between the inspection images of the inspection object S.

For example, in the second embodiment illustrated in FIG. 4, an infrared ray L2 reflected by one surface of an inspection object S and an infrared ray L2 passing through the inspection object S from one surface to the other surface are detected, but a configuration in which an infrared ray L2 reflected by the other surface of the inspection object S and an infrared ray L2 passing through the inspection object S from one surface to the other surface are detected may be employed or a configuration in which an infrared ray passing through the inspection object S from the other surface to the one surface is detected may be employed. The same is true of detection based on an ultraviolet ray L3. For example, a configuration in which an infrared ray L2 reflected by one surface of an inspection object S is detected may be added to the second embodiment illustrated in FIG. 4.

In the aforementioned embodiments, an X-ray L1, an infrared ray L2, and an ultraviolet ray L3 are applied to an inspection object S from above or below (so-called vertical application), but the inspection direction is not limited thereto. For example, a configuration in which an X-ray L1, an infrared ray L2, and an ultraviolet ray L3 are applied to an inspection object S from a lateral surface side thereof (so-called horizontal application) may be employed.

In the aforementioned embodiment, the protection unit 21 is provided to cover the infrared ray application unit 8 and the infrared ray detection unit 9, but the protection unit 21 may include a protection unit 21A that covers the infrared ray application unit 8 and a protection unit 21B that covers the infrared ray detection unit 9 as illustrated in (a) of FIG. 8. With this configuration, an infrared ray L2 emitted from the infrared ray application unit 8 can be prevented from being reflected by the inside of the protection unit 21 and directly detected by the infrared ray detection unit 9. The same is true of the protection unit 44. As illustrated in (b) of FIG. 8, the protection unit 44 may include a protection unit 44A that covers the ultraviolet ray application unit 42 and a protection unit 44B that covers the ultraviolet ray detection unit 43. With this configuration, an ultraviolet ray L3 emitted from the ultraviolet ray application unit 42 can be prevented from being reflected by the inside of the protection unit 44 and directly detected by the ultraviolet ray detection unit 43.

An infrared multi-line sensor 17A having sensitivity to different wavelength bands may be used as the infrared line sensor 17 of the infrared ray detection unit 9. As illustrated in (a) of FIG. 9, the infrared multi-line sensor 17A includes an infrared line sensor 171a and an infrared line sensor 172a which are disposed at a predetermined interval due to a dead band. The infrared multi-line sensor 17A is disposed such that extension directions of the infrared line sensor 171a and the infrared line sensor 172a are perpendicular to the carrying direction of an inspection object S.

As illustrated in (b) of FIG. 9, an optical filter 171b that transmits an infrared ray of a first infrared wavelength band is disposed on the infrared line sensor 171a, and an optical filter 172b that transmits an infrared ray of a second infrared wavelength band is disposed on the infrared line sensor 172a. The first infrared wavelength band ranges, for example, from 900 nm to 1400 nm. The second infrared wavelength band ranges, for example, from 1400 nm to 1700 nm.

With the infrared multi-line sensor 17A, for example, when insects, plastics, wood pieces, or rubbers in food are detected as foreign matter, food and foreign matter (insects, plastics, rubber, and the like) can be easily distinguished by calculating a ratio or a difference between an image of an infrared ray of a wavelength ranging from 900 nm to 1400 nm and an image of an infrared ray of a wavelength ranging from 1400 nm to 1700 nm. This is because an infrared absorbance of food changes greatly in a wavelength area equal to or greater than 1400 nm, but an absorbance of foreign matter does not change greatly in the same area. The first infrared wavelength band and the second infrared wavelength band may overlap partially.

In the infrared multi-line sensor 17A, a first control pulse for controlling imaging in the infrared line sensor 171a and a second control pulse for controlling imaging in the infrared line sensor 172a may be set based on a width of a dead band and a carrying speed of an inspection object S. In this case, the frequency of the first control pulse and the frequency of the second control pulse may be set based on the width of a dead band and the carrying speed of an inspection object S, or a delay time of a rising edge of the first control pulse with respect to a rising edge of the second control pulse may be set based on the width of a dead band and the carrying speed of an inspection object S. Accordingly, it is possible to acquire an infrared image at the same position of an inspection object S according to different wavelengths.

An infrared multi-line sensor 17B having sensitivity to different wavelength bands may be used as the infrared line sensor 17 of the infrared ray detection unit 9. As illustrated in (a) of FIG. 10, the infrared multi-line sensor 17B includes an infrared line sensor 171a, an infrared line sensor 172a, and an infrared line sensor 173a which are disposed at a predetermined interval due to a dead band. The infrared multi-line sensor 17B is disposed such that extension directions of the infrared line sensor 171a, the infrared line sensor 172a, and the infrared line sensor 173a are perpendicular to the carrying direction of an inspection object S.

As illustrated in (b) of FIG. 10, an optical filter 171b that transmits an infrared ray of a first infrared wavelength band is disposed on the infrared line sensor 171a, an optical filter 172b that transmits an infrared ray of a second infrared wavelength band is disposed on the infrared line sensor 172a, and an optical filter 173b that transmits an infrared ray of a third infrared wavelength band is disposed on the infrared line sensor 173a. The first infrared wavelength band ranges, for example, from 900 nm to 1200 nm. The second infrared wavelength band ranges, for example, from 1200 nm to 1400 nm. The third infrared wavelength band ranges, for example, from 1400 nm to 1700 nm.

With the infrared multi-line sensor 17B, for example, when insects, a plurality of types of plastics, wood pieces, or rubbers in food are detected as foreign matter, food and foreign matter (insects, plastics, rubber, and the like) can be easily distinguished and the types of plastics, wood pieces, rubbers, and the like can be distinguished by calculating a ratio or a difference between an image of an infrared ray of a wavelength ranging from 900 nm to 1200 nm, an image of an infrared ray of a wavelength ranging from 1200 nm to 1400 nm, and an image of an infrared ray of a wavelength ranging from 1400 nm to 1700 nm. The first infrared wavelength band and the second infrared wavelength band may overlap partially, or the second infrared wavelength band and the third infrared wavelength band may overlap partially.

REFERENCE SIGNS LIST 1, 31, 41 . . . Foreign matter inspection device, 5 . . . Carriage unit, 6 . . . X-ray application unit, 7 . . . X-ray detection unit, 8 (8A, 8B) . . . Infrared ray application unit, 9 (9A, 9B) Infrared ray detection unit, 10 . . . Synchronization unit, 11 . . . Image generating unit, 21 (21A, 21B), 44 (44A, 44B) . . . Protection unit, 22 . . . Slit, 42 . . . Ultraviolet ray application unit, 43 . . . Ultraviolet ray detection unit, L1 . . . X-ray, L2 . . . Infrared ray, L3 . . . Ultraviolet ray, S . . . Inspection object

The invention claimed is:

1. A foreign matter inspection device configured to inspect whether foreign matter is included in an inspection object, the foreign matter inspection device comprising:
a carriage unit configured to carry the inspection object in a predetermined carrying direction;
an X-ray application unit configured to apply X-rays to the inspection object carried by the carriage unit;
an X-ray detection unit configured to detect X-rays transmitted by the inspection object and to output X-ray image data based on the detection result;
an infrared ray application unit configured to apply infrared rays to the inspection object carried by the carriage unit;
an infrared ray detection unit configured to detect infrared rays from the inspection object and to output infrared image data based on the detection result;
a protection unit formed of a member blocking X-rays and transmitting infrared rays and configured to cover the infrared ray application unit and the infrared ray detection unit; and
an image generating unit configured to generate an X-ray image of the inspection object based on the X-ray image data and to generate an infrared image of the inspection object based on the infrared image data,
wherein a window formed of a member blocking X-rays and transmitting infrared rays is provided on a part located on an optical path of an infrared ray from the infrared ray application unit and an infrared ray from the inspection object of the protection unit.

2. The foreign matter inspection device according to claim 1, wherein an application position of X-rays to the inspection object and an application position of infrared rays to the inspection object are different in the carrying direction, and
wherein a detection timing of X-rays in the X-ray detection unit and a detection timing of infrared rays in the infrared ray detection unit are synchronized.

3. The foreign matter inspection device according to claim 2, wherein the X-ray detection unit outputs a synchronization signal to the infrared ray detection unit according to the detection timing of the X-ray.

4. The foreign matter inspection device according to claim 2, wherein the infrared ray detection unit outputs a synchronization signal to the X-ray detection unit according to the detection timing of the infrared ray.

5. The foreign matter inspection device according to claim 2, further comprising a synchronization unit configured to synchronize a detection timing of X-rays in the X-ray detection unit and a detection timing of infrared rays in the infrared ray detection unit.

6. The foreign matter inspection device according to claim 5, wherein the synchronization unit includes a pulse generator.

7. The foreign matter inspection device according to claim 5, wherein the synchronization unit includes an encoder that detects an amount of movement of the inspection object in the carriage unit.

8. The foreign matter inspection device according to claim 1, wherein the infrared ray detection unit detects at least one of the infrared rays reflected by the inspection object and the infrared rays transmitted by the inspection object.

9. The foreign matter inspection device according to claim 1, wherein the infrared ray detection unit includes a slit that is disposed to correspond to an optical path of infrared rays from the inspection object.

10. The foreign matter inspection device according to claim 1, wherein the image generating unit generates an overlap image in which the X-ray image and the infrared image overlap.

11. The foreign matter inspection device according to claim 10, wherein the image generating unit causes the X-ray image and the infrared image to overlap after correcting one of the X-ray image and the infrared image such that the number of pixels of the X-ray image and the number of pixels of the infrared image match.

12. The foreign matter inspection device according to claim 1, further comprising:
- an ultraviolet ray application unit configured to apply ultraviolet rays to the inspection object carried by the carriage unit;
- an ultraviolet ray detection unit configured to detect ultraviolet rays from the inspection object and to output ultraviolet image data based on the detection result; and
- a protection unit formed of a member blocking X-rays and transmitting ultraviolet rays and configured to cover the ultraviolet ray application unit and the ultraviolet ray detection unit.

\* \* \* \* \*